United States Patent
Cowell et al.

(10) Patent No.: US 10,781,848 B2
(45) Date of Patent: Sep. 22, 2020

(54) DEVICES FORMED OF INTERCONNECTED COMPONENTS

(71) Applicant: Treemagineers Ltd., Scotland (GB)

(72) Inventors: Christopher Sidney Cowell, Scotland (GB); Elliot James Tanner, North Wales (GB)

(73) Assignee: TREEMAGINEERS LTD., Pitlochry (GB)

( * ) Notice: Subject to any disclaimer, the term of this patent is extended or adjusted under 35 U.S.C. 154(b) by 0 days.

(21) Appl. No.: 15/817,731

(22) Filed: Nov. 20, 2017

(65) Prior Publication Data
US 2018/0142725 A1 May 24, 2018

(30) Foreign Application Priority Data

Nov. 22, 2016 (GB) .................................. 1619728.7

(51) Int. Cl.
*F16B 45/02* (2006.01)
*A63B 29/02* (2006.01)
*F16B 45/04* (2006.01)

(52) U.S. Cl.
CPC .............. *F16B 45/02* (2013.01); *A63B 29/02* (2013.01); *F16B 45/04* (2013.01); *Y10T 24/45272* (2015.01)

(58) Field of Classification Search
CPC ............. Y10T 24/3492; Y10T 24/2485; Y10T 24/2487; Y10T 24/2484; Y10T 24/47; Y10T 24/4755; Y10T 24/45115; Y10T 24/45005; Y10T 24/3493
See application file for complete search history.

(56) References Cited

U.S. PATENT DOCUMENTS

| | | | | |
|---|---|---|---|---|
| 358,813 A | * | 3/1887 | Jones ...................... | F16B 45/02 24/599.7 |
| 648,429 A | * | 5/1900 | Peterson ................. | F16B 45/02 24/599.1 |
| 909,782 A | * | 1/1909 | Gibson ................... | F16B 45/00 24/265 H |

(Continued)

FOREIGN PATENT DOCUMENTS

| | | |
|---|---|---|
| DE | 20 2013 102 438 U1 | 11/2013 |
| EP | 3 088 769 A1 | 11/2016 |

(Continued)

*Primary Examiner* — Robert Sandy
*Assistant Examiner* — Michael S Lee
(74) *Attorney, Agent, or Firm* — Nixon & Vanderhye (57) ABSTRACT

In the disclosed devices formed from interconnected components, each includes a yoke component, a boss component and an axle bolt. The yoke component includes: a carabiner body with a back, an opening, and a yoke formation. The yoke formation includes a U-shaped section open to the outside of the body, defining a space between two legs, the legs having bearing surfaces through each of which a respective axle bore is formed. The back extends from the yoke formation. A spur extends from the yoke formation. A gate on the body pivots between closed and open positions. The boss component has flat, parallel external bearing surfaces, an axle bore extending through the boss component, the axle bore opening at each bearing surface. The axle bolt passes through the axle bores in the yoke and boss component.

9 Claims, 10 Drawing Sheets

(56) References Cited

U.S. PATENT DOCUMENTS

| | | | | | |
|---|---|---|---|---|---|
| 967,664 | A | * | 8/1910 | Peterson | F16B 45/00 24/265 H |
| 982,556 | A | * | 1/1911 | White | F16G 15/06 278/96 |
| 1,567,719 | A | | 12/1925 | Erlandsen | |
| 2,764,792 | A | * | 10/1956 | Mansfield | B63B 21/54 24/375 |
| 5,566,428 | A | * | 10/1996 | Takahashi | B29C 45/0017 24/265 H |
| 6,019,407 | A | * | 2/2000 | Ohman | B66C 1/18 24/199 |
| 6,317,940 | B1 | * | 11/2001 | Matoba | F16B 45/02 24/600.9 |
| 10,274,046 | B2 | * | 4/2019 | Cowell | F16G 15/08 |
| 2010/0180411 | A1 | | 7/2010 | Jang | |
| 2011/0005047 | A1 | * | 1/2011 | Gangakhedkar | B60P 7/0823 24/600.9 |

FOREIGN PATENT DOCUMENTS

| | | |
|---|---|---|
| GB | 2 379 478 A | 3/2003 |
| JP | 2010007809 A | 1/2010 |
| KR | 101505142 B1 | 3/2015 |
| WO | 2011/092018 A1 | 8/2011 |

* cited by examiner

DEVICES FORMED OF INTERCONNECTED COMPONENTS

BACKGROUND TO THE INVENTION

Field of the Invention

The present invention relates to devices formed of interconnected components. It has particular, but not exclusive, application to components used in the creation of devices of personal protective equipment or devices in a rigging system used, for example by a person working at height or by a climber.

Summary of the Prior Art

People performing rope access in buildings, arborists, climbers, amongst others, require a wide range of devices to ensure that they can be safe in the many circumstances in which they find themselves. Conventionally, the range of devices available has been limited by the ability of manufacturers to design, manufacture and stock a range of devices, some of which may sell only infrequently.

SUMMARY OF THE INVENTION

An aim of this invention is to provide a system by means of which a range of components can be interconnected in diverse configurations to create a wide range of devices. This allows a greater range of devices to be created more cost-effectively than is the case when devices have to be designed and manufactured individually.

To this end, from a first aspect, this invention provides an assembled device comprising a yoke component, a boss component and an axle bolt, the yoke component preferably comprising one or more of: a. a carabiner body that includes a back, an opening, and a yoke formation, wherein: i. the yoke formation is constituted by a U-shaped section that is open to the outside of the body, and which defines a space between two generally parallel legs, the legs having parallel, facing bearing surfaces through each of which a respective coaxial axle bore is formed; ii. the back extends from the yoke formation to an end that defines a first limit of the opening; and iii. a spur extends from the yoke formation to an end that defines a second limit of the opening; b. a gate carried on the body and which can be pivoted between a closed position, in which it closes the opening, and an open position in which an object can be passed through the opening into or out of a space within the body; the boss component having flat, parallel external bearing surfaces, an axle bore extending through the boss component, the axle bore opening at each bearing surface and extending normal thereto; and the axle bolt passes through the axle bores in the yoke component and the boss component.

A device embodying the invention may further include a locking screw that engages with the axle bolt, typically its head, to resist or prevent removal of the axle bolt from the axle bore.

The yoke component and/or the boss component may include one or more of a carabiner body, a swivel, a hook or an eye.

In some embodiments, the yoke component can be connected to a plurality of boss components. That is, it may serve as a connector instead of a functional component of the device. Likewise, the boss component can, in some embodiments, be connected to a plurality of yoke components.

Typically, an assembled device according to any preceding claim that is part of a rigging system for use in climbing, rope access or working at height.

DETAILED DESCRIPTION OF THE PREFERRED EMBODIMENTS

Embodiments of the invention will now be described in detail, by way of example, and with reference to the accompanying drawings.

Figure 1:
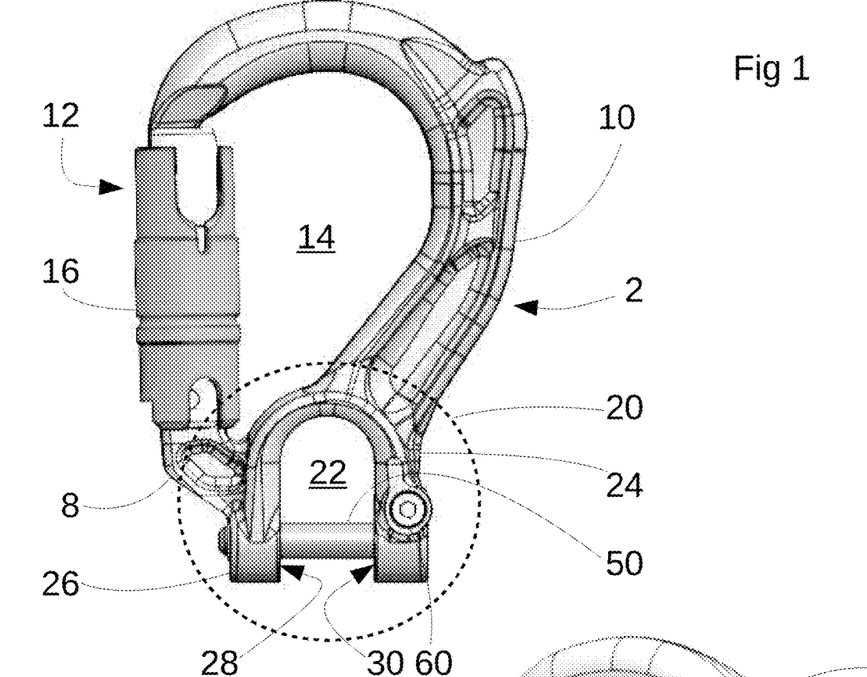
FIG. 1 shows a yoke component for use in construction of a device embodying the invention.

With reference first to FIG. 1, the yoke component that can be considered to be a modified carabiner. As with a standard carabiner, the yoke component includes a body 2 that is very approximately C-shaped, with an opening. A gate 12 is carried on the body 2, which can be pivoted between a closed position (towards which it is biased by a spring), in which it closes the opening, and an open position in which an object can be passed through the opening into or out of a space 14 within the body 2. The gate 12 includes a locking barrel 16 that prevents movement of the gate 12 from the closed position until it is operated by a user.

The body 2 further includes a yoke formation, indicated generally at 20. The yoke formation 20 comprises a U-shaped section that is open to the outside of the body. The U-shaped section defines a space 22 between two generally parallel legs 24, 26. End portions of the legs 24, 26 are formed with parallel, mutually facing bearing surfaces 28, 30. A back portion 10 of the body 2 extends from the U-shaped section of yoke formation 20, extending to an end portion that defines a first limit of the opening. A spur 8 extends from one of the parallel legs 26, extending to an end portion that defines a second limit of the opening. In this embodiment, the gate 12 is pivotally connected to the spur 8 and can close against a nose formed on the back 10.

A respective axle bore is formed through each of the legs 24, 26, the bores being coaxial, lying on a component axis, and perpendicular to the bearing surfaces 28, 30. An outer part 34 (that is, a part that is remote from the second leg) of the axle bore in the first leg 24 is counterbored. An outer part 36 of the axle bore in the second leg 26 has a hexagonal cross-section. The inner portions of each bore is of circular section and of lesser diameter than the outer portions. A tapped transverse bore 38 extends into the first leg 24 and has a counterbored section adjacent to its opening. The transverse bore 38 intersects with the counterbored portion 34 of the axle bore, with the axis of the transverse bore 38 extending adjacent to the counterbored portion 34. A respective notch 32 is formed in each leg 24, 26, extending from an outer end surface of the leg and intersecting the respective bearing surface 28, 30.

Figure 2:
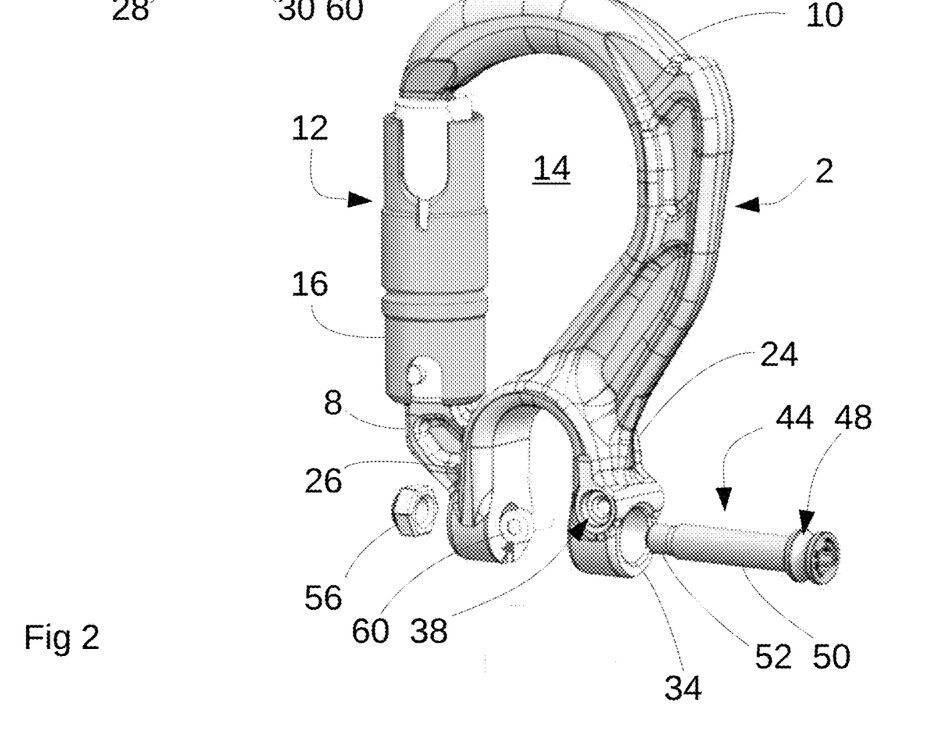
FIG. 2 is an exploded version of FIG. 1.

The yoke component further includes an axle bolt 44. The axle bolt 44 has a head 46 similar to that of a cap screw with a hexagonal recess for receiving a drive bit. A circumferential concave arcuate groove 48 extends around an outside peripheral wall of the head. A cylindrical shaft 50 extends from the head 46 and terminates in an externally threaded section 52 remote from the head 46. The threaded section 52 is of smaller diameter than the shaft 50 such that a shoulder is formed between the threaded section 52 and the shaft 50.

To assemble the yoke component to the condition shown in FIG. 1, a self-locking nut 56 is placed into the outer part 36 of the axle bore in the second leg 26. The nut 56 is selected to have a close fit within the bore such that its rotation within the bore is substantially prevented and to have a thread that corresponds to that of the axle bolt 44. The axle bolt is then inserted, threaded section 52 first, through the axle bore in the first leg 24, and the threaded section 52 is screwed into the nut 56 and tightened such that the nut 56 abuts the shoulder of the axle bolt 44 and the head 48 is received within the counterbored portion 34 of the axle bore, in which it is a close fit. A cap screw 60 is then screwed into the transverse bore 38, where it may be secured by thread locking compound, such that its head is received within the counterbored section of the transverse bore 38. The shank of the cap screw 60 passes along a section of the concave groove 48 of the axle bolt 44, and serves to lock the axle bolt 44 against removal from the axle bore.

Figure 3:
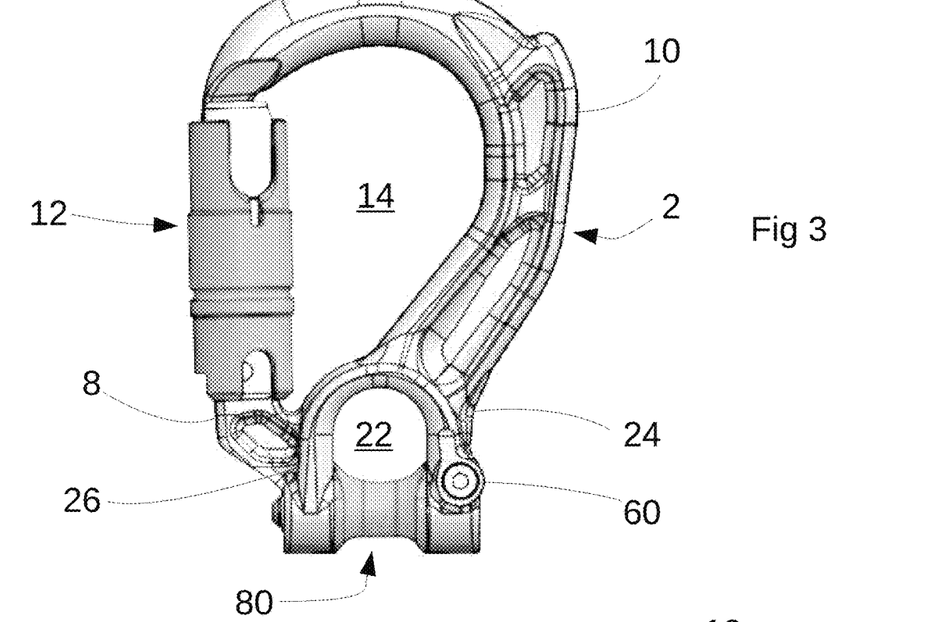
FIG. 3 shows a first device that incorporates the yoke component of FIG. 1.
Figure 4:
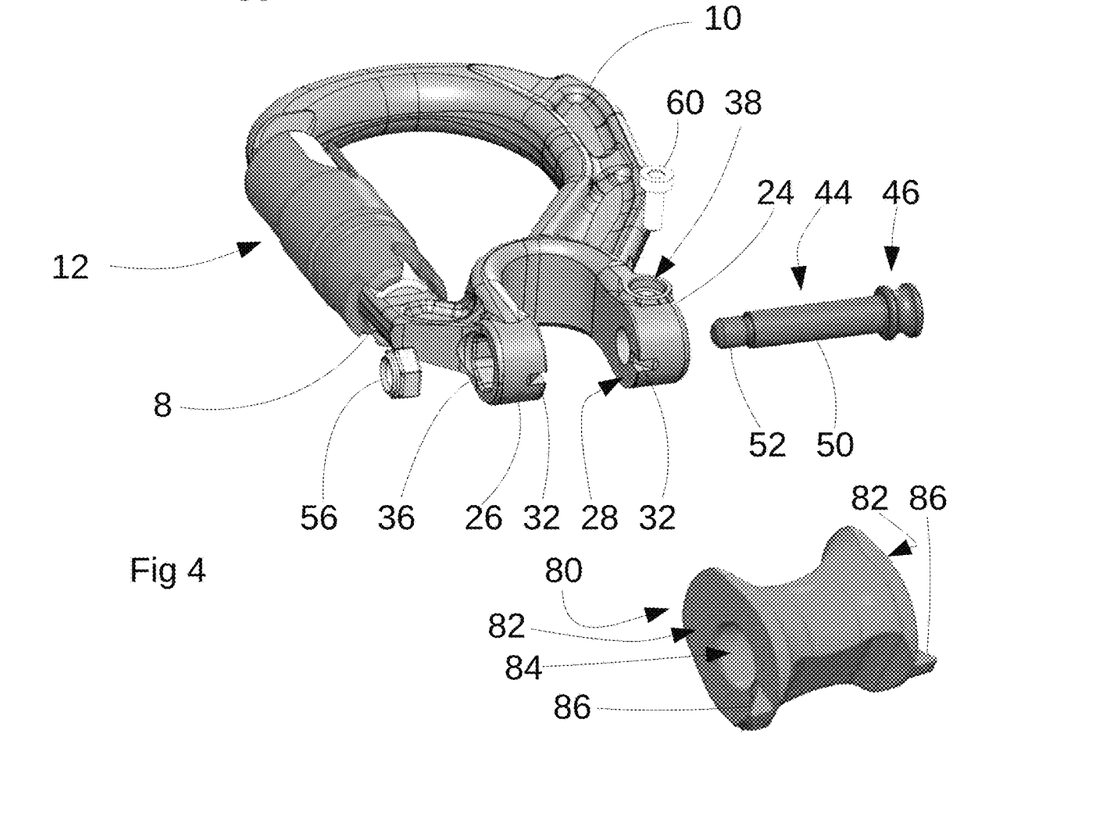
FIG. 4 is an exploded view of the device of FIG. 3.

A variety of boss components can be connected to the yoke component to make a functional device. A simple example is shown in FIGS. 3 and 4. In this example, the boss component is a spacer 80 that is formed from a solid body. The body has flat, parallel external surfaces 82 that are spaced apart by a distance just less than the spacing between the bearing surfaces 28, 30 of the yoke formation. An axle bore 84 extends through the spacer 80, opening at each of the flat external surfaces 82. A respective locking tab 86 projects from each flat external surface adjacent to the opening of the axle bore 84. The spacer has curved external surfaces shaped such that a rope or cable can be carried on them with a suitable bend radius and low sliding friction, and prevents the rope from urging the axle bolt 44 to rotate.

To assemble this device, the procedure set forth in the last-but-one preceding paragraph is followed, but prior to the axle bolt 44 being inserted, the spacer 80 is placed between the bearing surfaces 28, 30, with each locking tab 86 entering a respective notch 32. The axle bore 84 of the spacer is, in this position, aligned with the axle bores 24, 26 of the legs, which allows the axle bolt 44? to be inserted, and assembly of the device to proceed as described. Engagement of the tabs 86 within the notches 32 prevents rotation of the spacer 80 about the axle bolt 44.

It will be seen that the device described provides two separate spaces through which an item can be passed; a first space 14 in the body 2 and a second space 22 in the yoke 20. Typically, a flexible fabric or metal connector will be received semi-permanently in the second space 22. This will remain in place during normal use of the device, but if it becomes worn or damaged, it can be replaced in a maintenance operation by removal of the cap screw 60 and the axle bolt 44, which allows the spacer 80 to come free from the yoke. The device can be re-assembled for subsequent use. By opening the gate 12, items can be passed into and out of the first space 14 during normal use, as is the case with a conventional carabiner.

The significant features of the yoke component are the bearing surfaces 28, 30, the axle bore and the axle bolt 44. Provided that these features are present, a yoke component may have many alternative configurations. Similarly, the significant features of the spacer 80 that allow it to be compatible with the yoke component are the flat, parallel external surfaces 82 and the axle bore 84. Provided that these features are present, a boss component may have many alternative configurations. Note that the tabs 86 are not essential because in some cases, it is intended that the boss component can rotate about the axle bolt 44, in which case, the tabs will not be present.

Figures 5, 6:
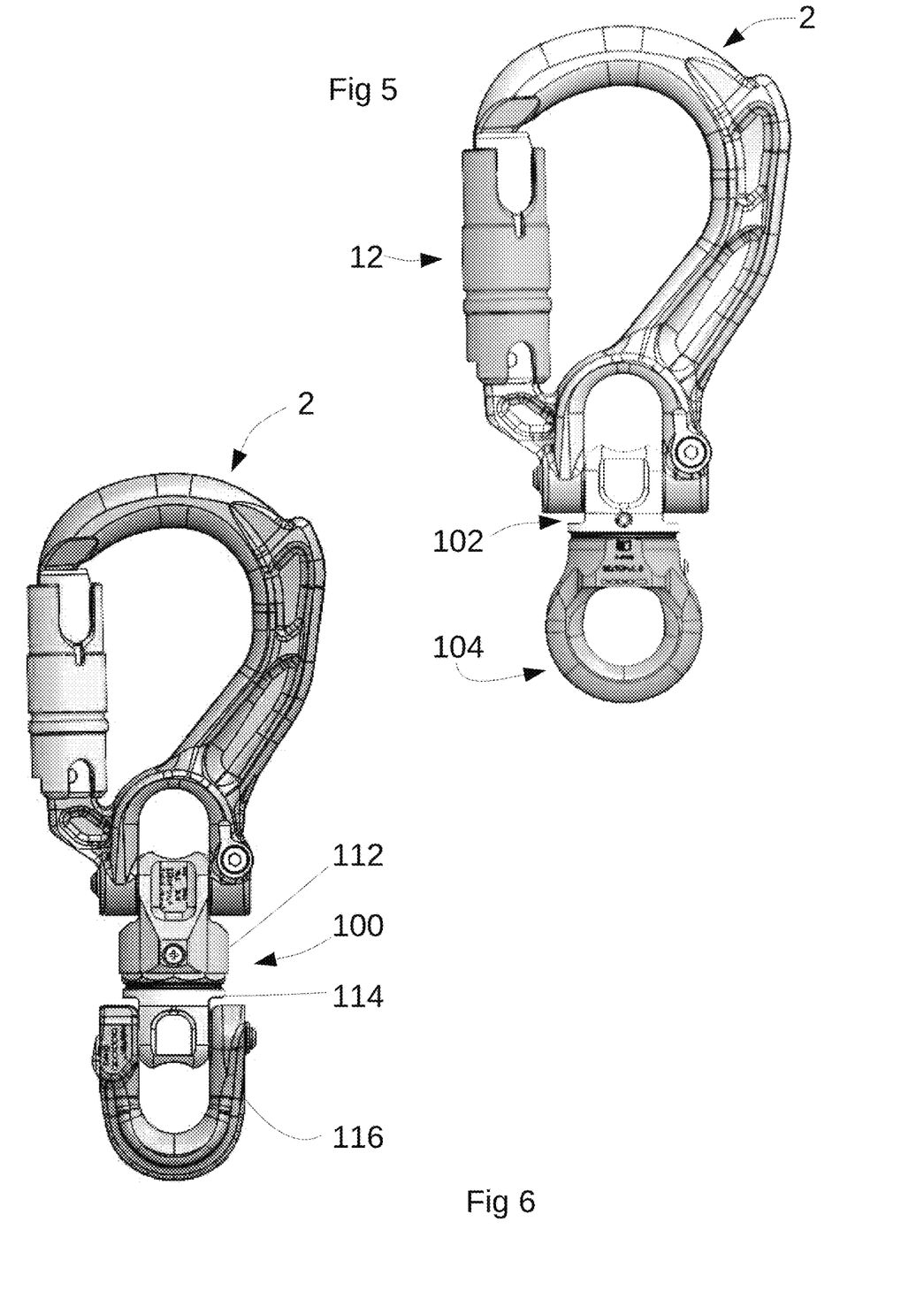
FIG. 5 shows a second device that incorporates the yoke component of FIG. 1 and a swivel.
FIG. 6 shows a third device that incorporates the yoke component of FIG. 1, a swivel and a second yoke component.

In the device of FIG. 5, the yoke component is identical to that of FIGS. 1 and 2. The boss component is constituted by a swivel, having first and second elements 102, 104 interconnected for free rotation about a swivel axis. The second element 104 is in the form of an eye to which other components can be connected. The first element 102 is a boss that includes the parallel external surfaces and the axle bore, but not, in this case, the locking tabs. The axle bore is transverse to and intersects the swivel axis, such that the eye can rotate freely with respect to the body 2 and can pivot to a limited extent about the axle bolt 44.

The device shown in FIG. 6 includes a first yoke component that is identical to that of FIGS. 1 and 2. The boss component is constituted by a swivel 100, having first and second elements 112, 114 interconnected for free rotation about a swivel axis. In this embodiment, each of the first and second elements 112, 114 has the surfaces and axle bore that allow it to function as a boss. The first element 112 is connected to the yoke component, as before. The device further includes a shackle 116 that also has the bearing surfaces, axle bolt and axle bore that allow it to function as a yoke, and this is connected to the second element 114 of the swivel. Thus, the device allows the shackle to rotate freely with respect to the body 10 and can pivot to a limited extent about each of the axle bolts of the first and the second elements 112, 114 of the swivel.

Figure 7:
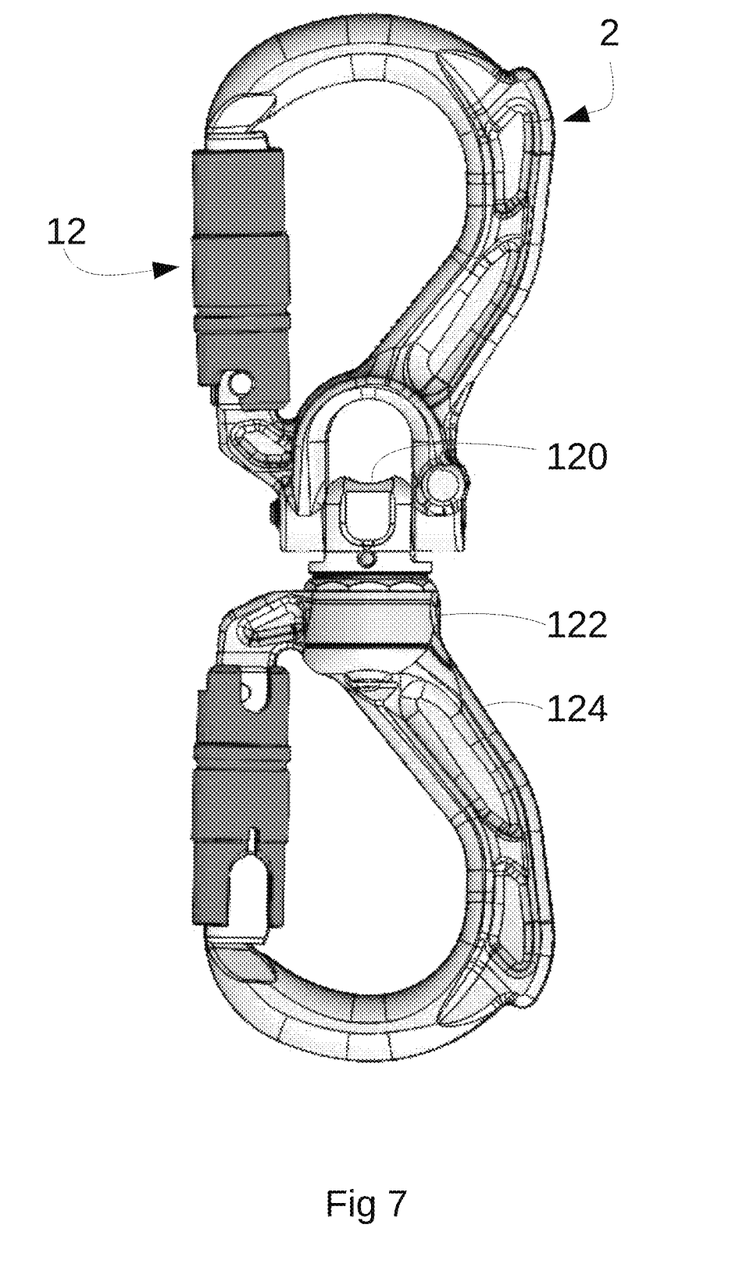
FIG. 7 shows a fourth device that incorporates a yoke component of FIG. 1 and a swivel that forms a boss and is connected to a carabiner body.

The device shown in FIG. 7 includes a first yoke component that is identical to that of FIGS. 1 and 2. The boss component is constituted by a first part 120 of a swivel. The first part 120 of the swivel is connected for rotation to a second part 122 that is integral with a carabiner body 124. This device provides, in effect, two carabiners that are interconnected for rotation about a major axis of each carabiner and which can pivot with respect to one another about a transverse axis.

Figure 8:
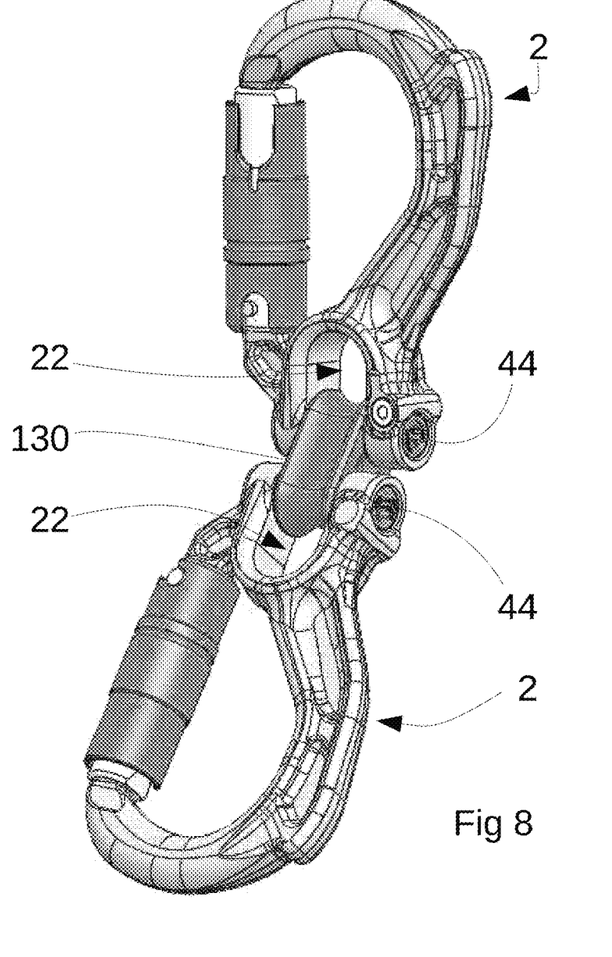
FIG. 8 shows a fifth device that incorporates two yoke components of FIG. 1 and a connector component.
Figure 9:
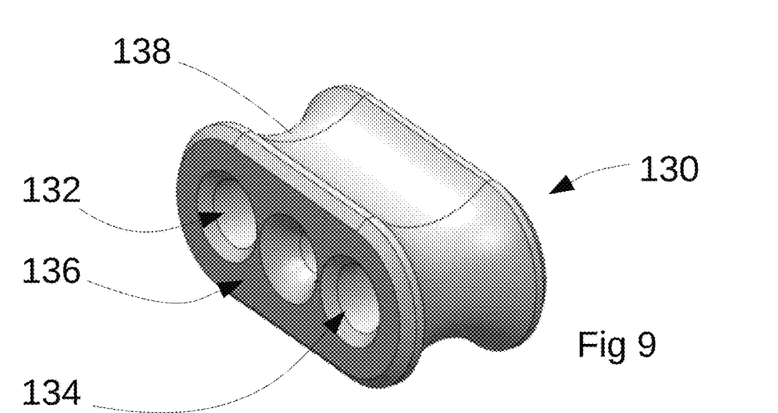
FIG. 9 shows a connector that constitutes a boss component of the device of FIG. 8.

The device of FIG. 8 uses two yoke components, each of which is identical to that of FIGS. 1 and 2. The boss component is constituted by a straight connector bar 130, which is shown in FIG. 9. The connector bar 130 has spaced, parallel axle bores 132, 134, each of which can receive a respective axle bolt 44. The connector bar 130 has parallel flat external surfaces 136, between which each of the axle bores 132, 134 extends. Thus, the connector bar 130 can be located between the bearing surfaces of two yoke components, and allows these yoke components to pivot with respect to one another and with respect to the connector bar 132 about parallel axle bolts 44. Between the flat external surfaces 136, the connector bar 132 has a peripheral surface 138 of convex cross-section that creates a constant hole size in the between the shackle and the connector bar 130 as the shackle pivots relative to the connector.

Figure 10:
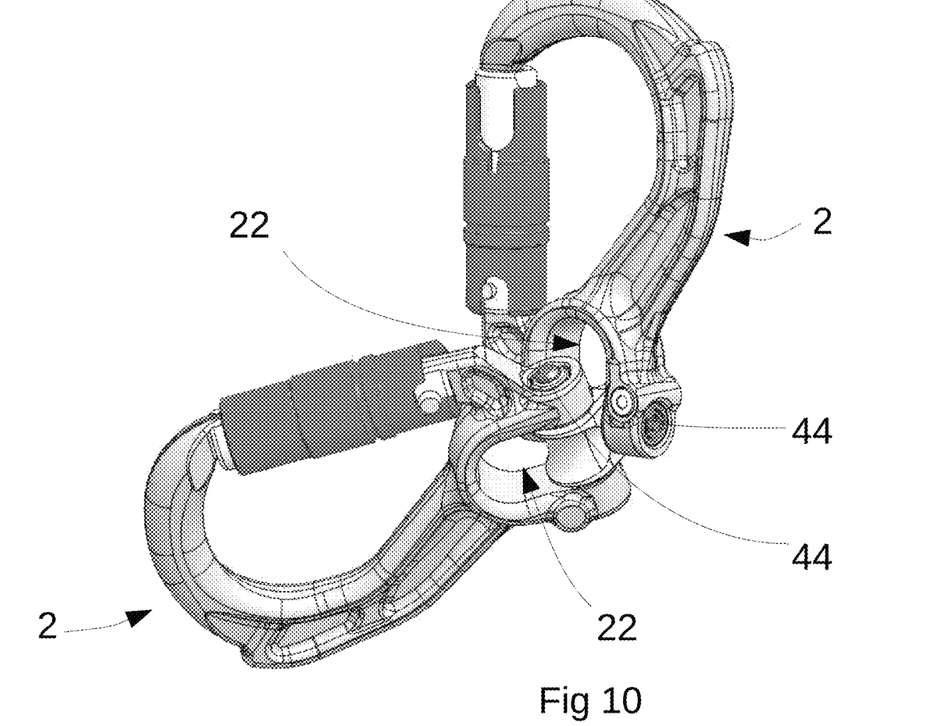
FIG. 10 shows a sixth device that incorporates two yoke components of FIG. 1 and an alternative connector component.
Figure 11:
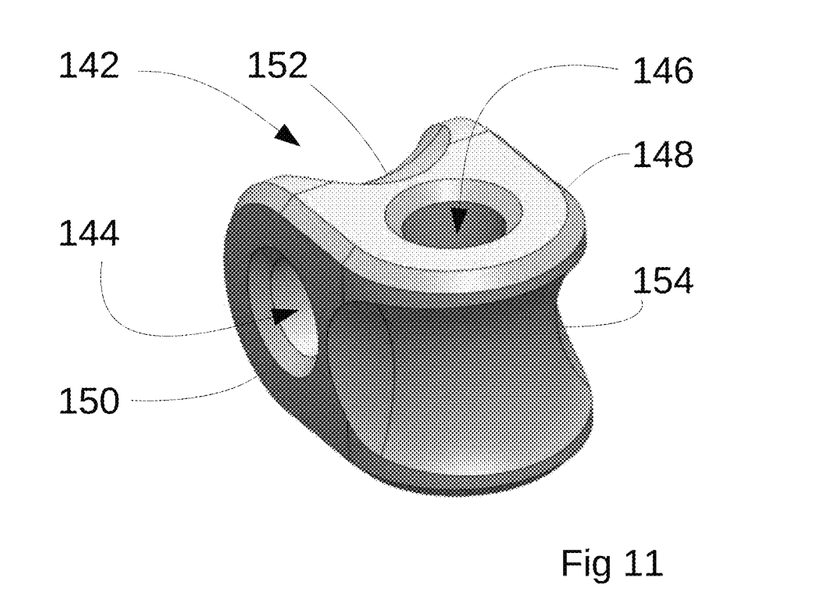
FIG. 11 shows a connector that constitutes a boss component of the embodiment of FIG. 10.

The device of FIG. 10 can be considered to be a variation of the device of FIG. 8. In this embodiment, a connector block 142 shown in FIG. 11 has axle bores 144, 146 that extend perpendicular to one another. Each bore 144, 146 terminates at a pair of flat external surfaces 148, 150, one of each pair being shown in FIG. 11. Thus, the connector block 142 can be located between the bearing surfaces of two yoke components 2, and allows these yoke components to pivot with respect to one another and with respect to the connector block 142 about perpendicular axle bolts 44. Peripheral regions 152, 154 of the block surrounding each of the axle bores 144, 146 has a convex cross section that creates a constant hole size in the between the shackle and the connector bar 130 as the shackle pivots relative to the connector.

Figure 12:
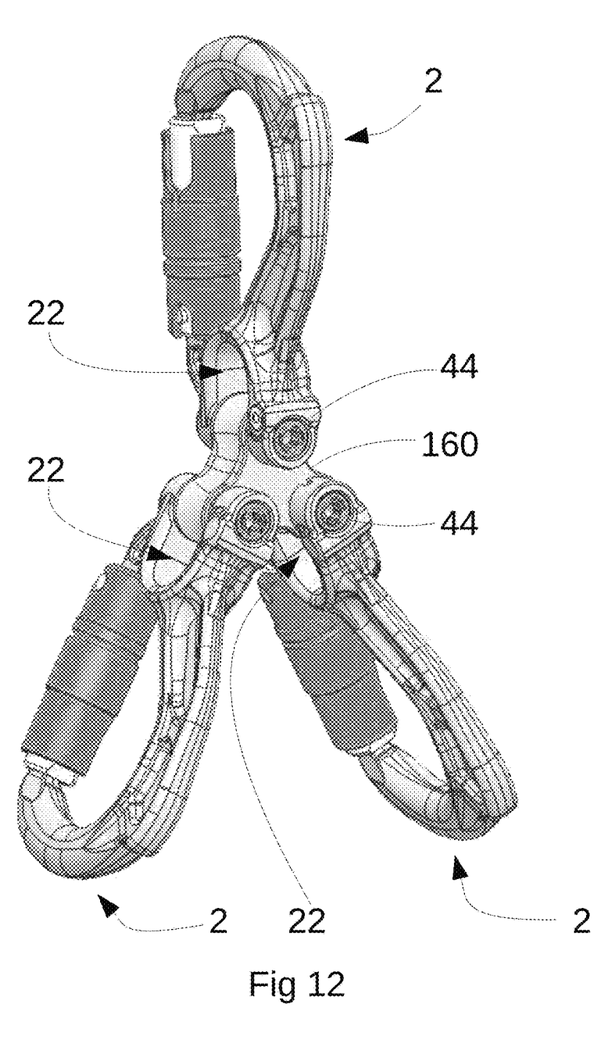
FIG. 12 shows a seventh device that incorporates three yoke components of FIG. 1 and an alternative connector component.
Figure 13:
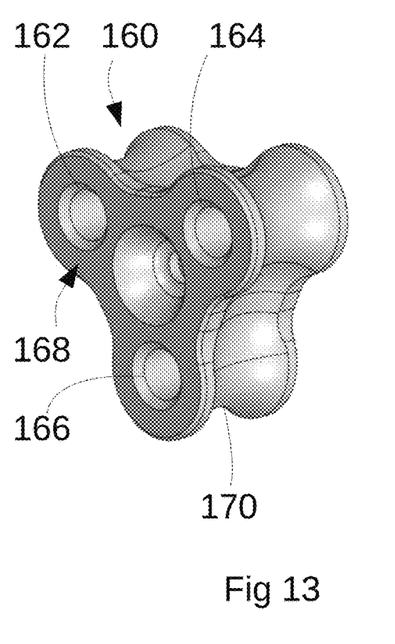
FIG. 13 shows a connector that constitutes a boss component of the embodiment of FIG. 12.

The device of FIG. 12 can be considered to be another variation of the device of FIG. 8. The device of FIG. 12 uses three yoke components, each of which is identical to that of FIGS. 1 and 2. The boss component is constituted by a three-way connector 160, which is shown in FIG. 13. The three-way connector 160 has three spaced, parallel axle bores 162, 164, 166 arranged in an equilateral triangle, each of which can receive a respective axle bolt 44. The three-way connector 160 has parallel flat external surfaces 168 (one being shown), between which each of the axle bores 162, 164, 166 extends. Thus, the three-way connector 160 can be located between the bearing surfaces of the three yoke components 2, and allows these yoke components to pivot with respect to one another and with respect to the three-way connector 160 about parallel axle bolts 44. Between the flat external surfaces 168, the three-way connector 160 has a peripheral surface 170 of convex cross-section that creates a constant hole size in the between the shackle and the connector bar 130 as the shackle pivots relative to the connector.

Figures 14, 15:
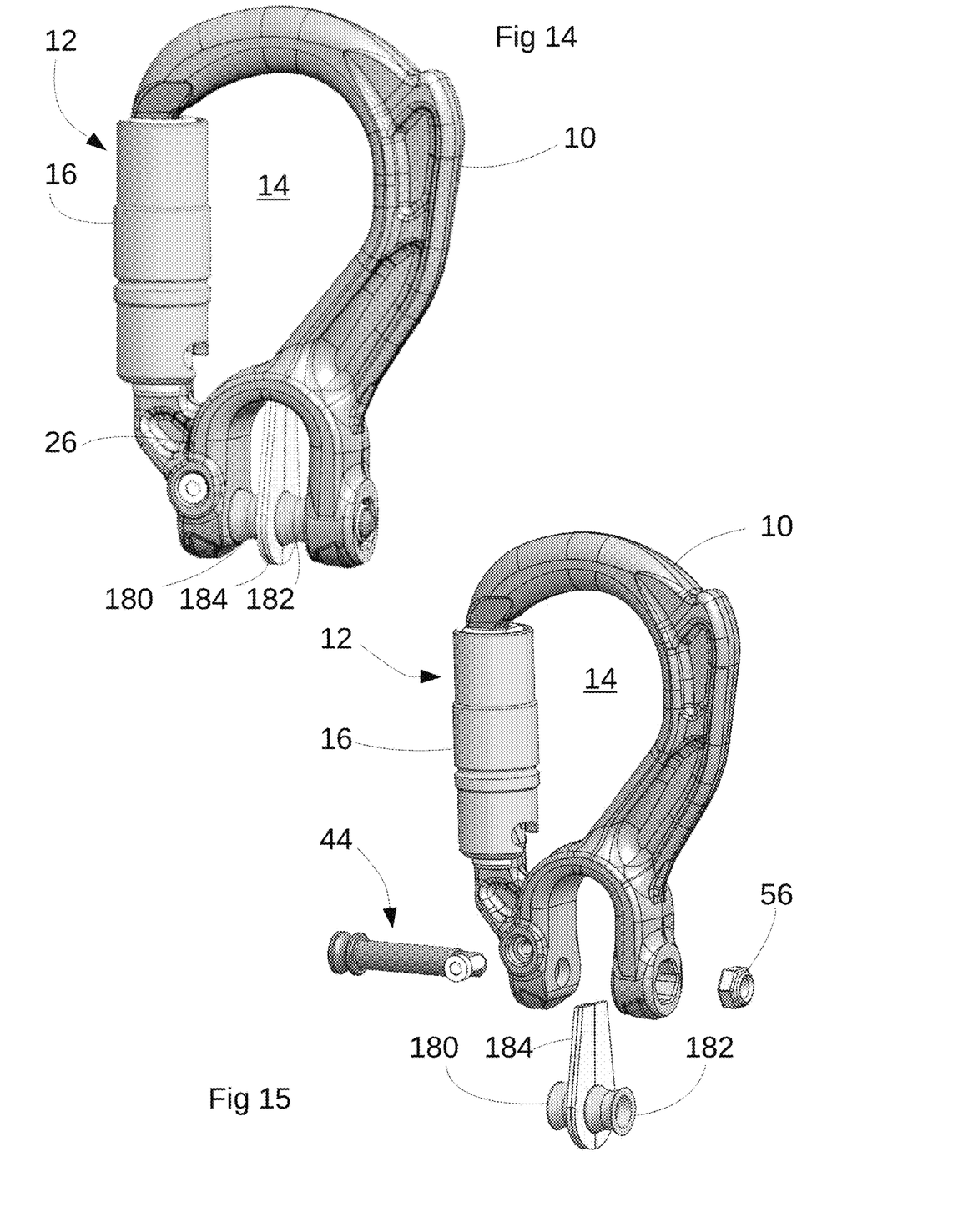
FIGS. 14 and 15 show an alternative application of a yoke component shown in FIGS. 1 and 2.

With reference now to FIGS. 14 and 15, a yoke component of FIGS. 1 and 2 is modified by providing two sheaves 180, 182 on the axle bolt 44 separated by a dividing plate 184. The sheaves 180, 182 can rotate freely and independently upon the axle bolt 44. An end surface of the dividing plate 184 abuts part of the U-shaped section of the yoke formation to prevent it from rotating about the axle bolt 44 and separates the parts of rope located on each sheave.

Figure 16:
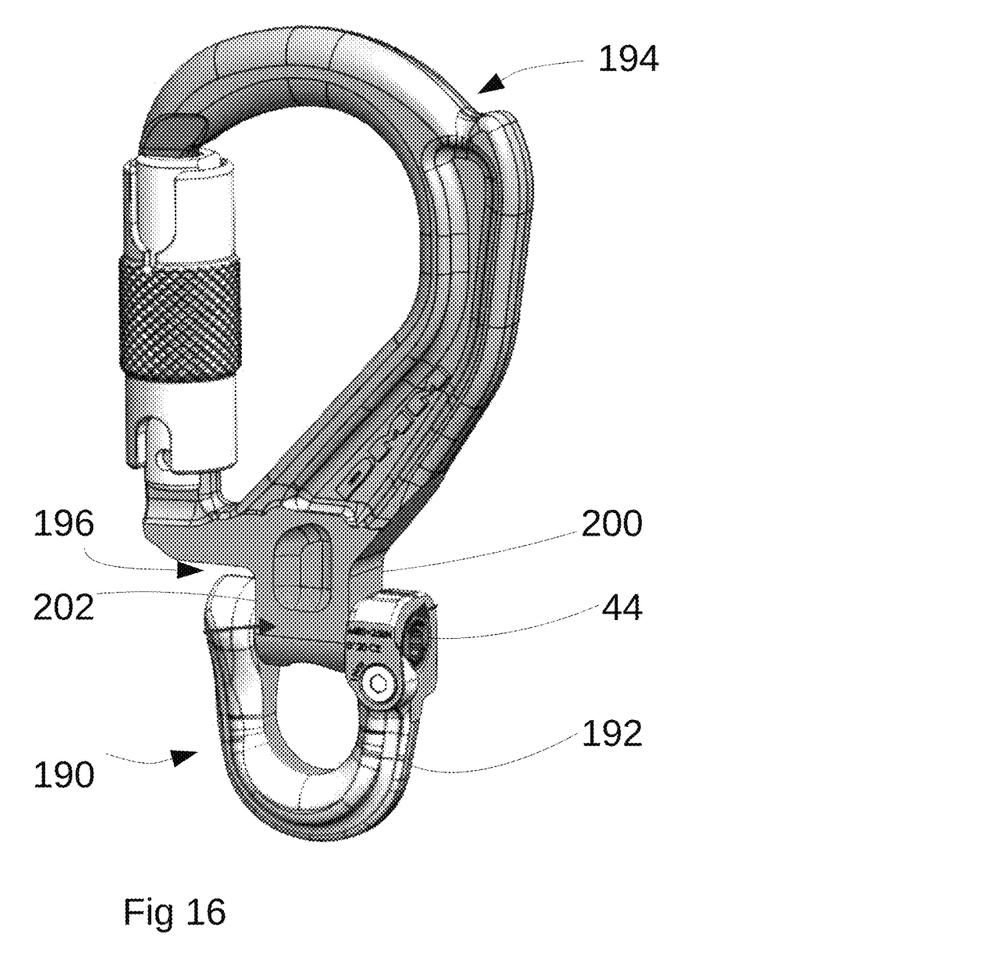
FIG. 16 shows a further embodiment of the invention.

FIG. 16 shows another arrangement of a device embodying the invention. In this embodiment, the yoke component 190 is a simple shackle that has a U-shaped body 192. End portions of the body 192 are formed with parallel, mutually facing bearing surfaces through which axle bores are formed. The boss component includes a carabiner body 194 from which a boss 196 projects. The boss has flat, parallel surfaces 200, 202 through each of which an axle bore extends. An axle bolt 44 is inserted through the axle bores to interconnect the yoke component 190 and the boss component 194 such that they can pivot about the axle bolt 44.

Figure 17:
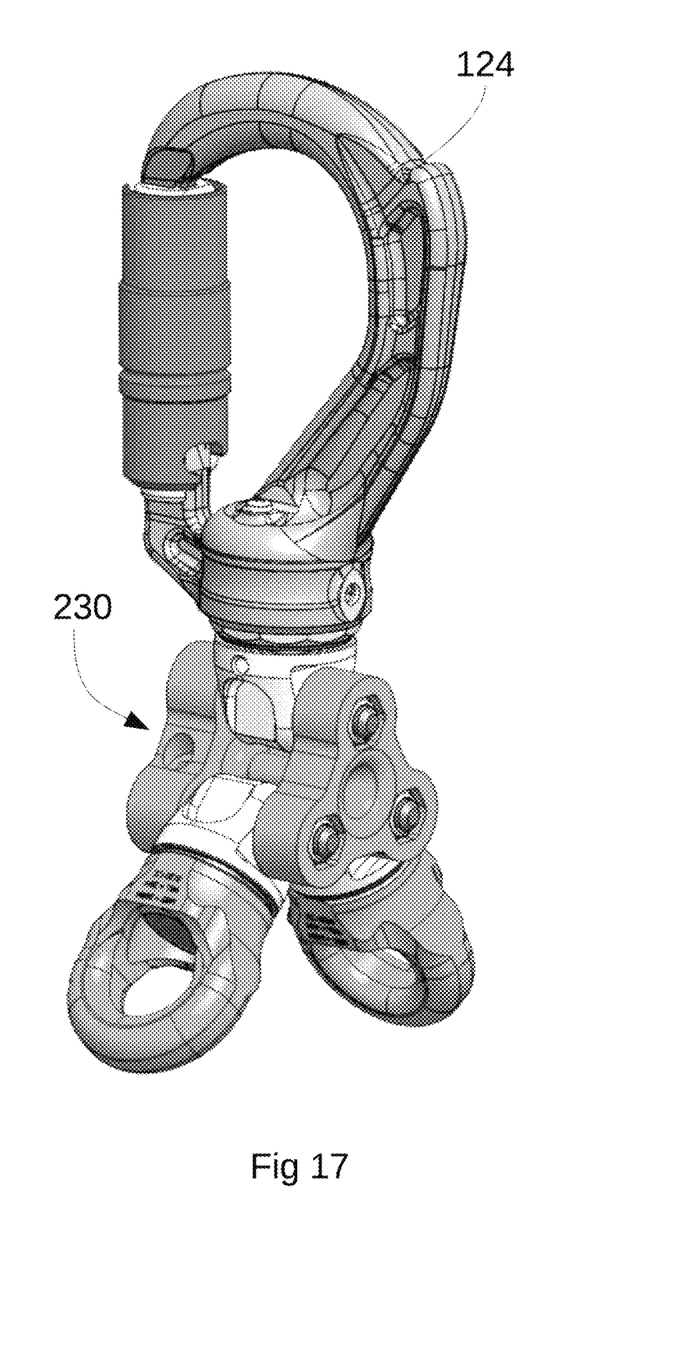
FIG. 17 shows an embodiment of the invention in which a connector constitutes a yoke component.
Figure 18:
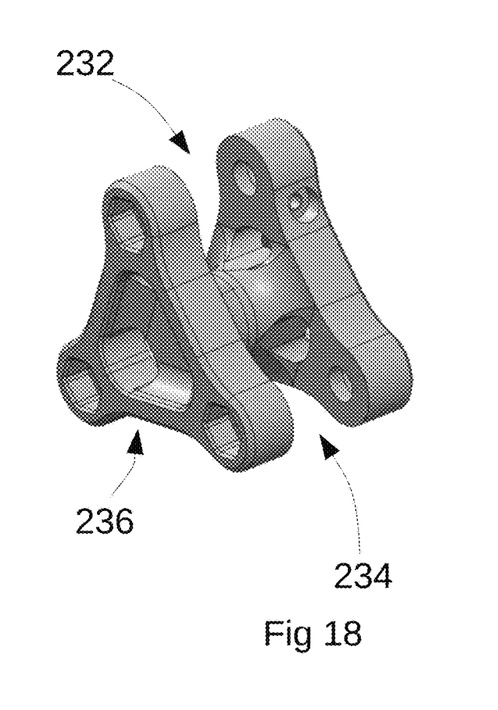
FIG. 18 shows a connector being a yoke component of the embodiments of FIG. 17.

The embodiments of the invention shown in FIGS. 17 to 18 reverse the function of the yoke and body components as compared with embodiments of FIGS. 1 to 15.

In the embodiment of FIG. 17, the yoke component 230 is a connector that can interconnect three similar or dissimilar boss components. The connector has three U-shaped yoke formations 232, 234, 236, each of which has a respective axle bore arranged on the vertices of an equilateral triangle. This can be used to connect diverse boss components such as a carabiner body and two swivels, as shown in FIG. 17.

What is claimed is:

1. An assembled device comprising a yoke component, a boss component and an axle bolt, the yoke component comprising:
    a. a carabiner body that includes a back, an opening, and a yoke formation, wherein:
        i. the yoke formation is constituted by a U-shaped section that is open to the outside of the body, and which defines a space between two generally parallel legs, the legs having parallel, facing bearing surfaces through each of which a respective coaxial axle bore is formed;
        ii. the back extends from the yoke formation to an end that defines a first limit of the opening; and
        iii. a spur extends from the yoke formation to an end that defines a second limit of the opening;
    b. a gate carried on the body and which can be pivoted between a closed position, in which it closes the opening, and an open position in which an object can be passed through the opening into or out of a space within the body;
    the boss component having flat, parallel external bearing surfaces, an axle bore extending through the boss component, the axle bore opening at each bearing surface and extending normal thereto; and
    the axle bolt passes through the axle bores in the yoke component and the boss component;
    wherein the boss component includes a swivel whereby part of the boss component can rotate with respect to the yoke component about an axis that is normal to the axle bolt.

2. The assembled device according to claim 1 in which the axle bolt can pivot with respect to at least one of the yoke component and the boss component.

3. The assembled device according to claim 1 in which the boss component includes a spacer that surrounds a length of the axle bolt.

4. The assembled device according to claim 1 in which the boss component includes one or more sheaves carried for rotation about the axle bolt.

5. The assembled device according to claim 1 in which the boss component can be connected to a plurality of similar or dissimilar yoke components.

6. The assembled device according to claim 1 in which the boss component includes a carabiner body.

7. The assembled device according to claim 1 which further includes a locking component that engages with the axle bolt to prevent removal of the axle bolt from the axle bore.

8. The assembled device according to claim 7 in which the locking component is a screw or a pin.

9. The assembled device according to claim 1 that is part of a rigging system for use in climbing, rope access, working at height or lifting.

* * * * *